United States Patent [19]

Spanur

[11] 4,442,184

[45] Apr. 10, 1984

[54] DRY PATH GAS VENTING SEAL

[75] Inventor: Frank G. Spanur, Parma Heights, Ohio

[73] Assignee: Union Carbide Corporation, Danbury, Conn.

[21] Appl. No.: 480,695

[22] Filed: Mar. 31, 1983

[51] Int. Cl.³ ............................................. H01M 2/12
[52] U.S. Cl. ........................................ 429/54; 429/82; 429/173; 429/174; 429/185; 29/623.2
[58] Field of Search ....................... 429/54, 55, 53, 82, 429/172, 173, 174, 185; 29/623.2, 623.1

[56] References Cited

U.S. PATENT DOCUMENTS

| 3,802,923 | 4/1974 | Spanur | 136/178 |
| 4,020,241 | 4/1977 | Heinz, Jr. | 429/54 |
| 4,056,659 | 11/1977 | Spanur et al. | 429/54 |
| 4,063,902 | 12/1977 | Heinz, Jr. | 29/623.2 |
| 4,079,172 | 3/1978 | Potts et al. | 429/54 |
| 4,146,681 | 3/1979 | Spanur | 429/54 |

Primary Examiner—Charles F. Lefevour
Attorney, Agent, or Firm—William E. Dickheiser

[57] ABSTRACT

A galvanic cell having a plastic closure member having a resiliently deformable peripheral annular flange defined by an annular groove having an inner upstanding wall, a base, and an outer upstanding wall in the upper surface of said closure member, said flange defining an annular notch forming a venting lip and a sealing lip, and said closure member defining at least one aperture extending through the base of said annular groove, said closure member being compressed such that the venting lip is positioned over the annular groove to form a closed groove; said closure operable such that internal pressure in the cell is released by the momentary deflection of the venting lip.

12 Claims, 3 Drawing Figures

DRY PATH GAS VENTING SEAL

FIELD OF THE INVENTION

This invention relates to cylindrical galvanic cells and more specifically to a cell construction employing a closure member which contains a resealable vent having a resilient plastic-to-plastic interface for controllably venting excess gas pressure from within the cell.

BACKGROUND OF THE INVENTION

Under certain conditions galvanic cells may generate large quantities of gas. As these cells are sealed in order to prevent loss of electrolyte, such gas generation may result in the formation of high pressures within such cells. If such high pressures are not vented, cell leakage, bulging and/or rupture may occur.

In the past many approaches have been adopted for releasing the internal pressure which may build up in galvanic cells. In general, it is preferable to employ resealable venting means in order to avoid drying of the cell's electrolyte and to prevent the ingress of oxygen from the atmosphere which can cause wasteful corrosion of the anode. Prior resealable venting means have generally employed a deformable plastic member located at the interface of the seal closure member and the metal container wall of the cell.

For example, U.S. Pat. Nos. 4,020,241 and 4,063,902 disclose a galvanic cell having a resealable vent closure consisting of a resilient elastomeric sponge gasket disposed and compressed between the cover of the cell and the upper wall of the cell's container. This vent closure is designed to vent low pressure gas buildup along the cover-gasket interface and/or container-gasket interface.

U.S. Pat. No. 4,079,172 discloses sealed galvanic dry cells having at least one gas venting passage disposed at the interface of the top surface of the cover and the curled-over rim of the container. The passage is defined as being a recess in the cover disposed below the curled-over rim and/or a notch in a portion of the curled-over rim.

U.S. Pat. No. 4,074,022 discloses sealed electric cells wherein the cell casing is fitted with a vent which consists of a tongue formed in a metal portion of the casing whose inner surface is in contact with a seal. The non-detached tongue in the casing wall is turned towards the enclosed volume of the casing. In the case of internal overpressure, the seal is deformed and allows the interior of the electric cell to communicate with the exterior.

U.S. Pat. No. 3,802,923 discloses a seal closure for the open end of a cell comprising a cover including an annular depending flange which has a circumferential notch for engaging the inwardly turned peripheral edge of the cell and a resilient sealing lip which resides on the curled over top portion of the container. Although the seal closure of this patent provides satisfactory results when used in conjunction with a sealant, cells employing such rim vent seals require special equipment not generally commercially available for their assembly.

Although prior art venting means such as those described above are effective for releasing excess interior pressure from galvanic cells, a major disadvantage of these venting means is that the excess pressure is released via a metal-plastic interface. A metal-plastic interface is not as desirable as a plastic-plastic interface for several reasons. For example, electrolyte may creep along metal surfaces due to electrocapillary action preventing the metal-plastic seal from resealing properly. Moreover, in cell containers comprising a consumable anode, such as zinc, the cell container tends to be corroded during the lifetime of the cell. This could lead to scoring or pitting of the metal at the plastic-metal interface and produce a corresponding reduction in seal effectiveness. Although it has been found that the use of a greasy sealant adequately protects the metal can in certain of the prior art venting means, particularly that described in U.S. Pat. No. 3,802,923, it is nevertheless desirable to possess alternative effective resealable venting means.

It is therefore an object of this invention to provide a closure member having resealable venting means which contains a "dry" all-plastic vent path for the release of excess pressure from the interior of a galvanic cell.

It is a further object of this invention to provide a closure member for galvanic cells which contains a resealable venting means, which cells may be readily assembled utilizing conventional equipment.

It is a further object of this invention to provide a method for the manufacture of galvanic cells which possess a resealable all-plastic vent path.

The foregoing and additional objects will become more fully apparent from the following description and the accompanying drawing.

SUMMARY OF THE INVENTION

This invention relates to a galvanic cell comprising a cylindrical container having an anode, a cathode separated from said anode by a separator, and electrolyte disposed therein; and a plastic closure member comprised of a resiliently deformable peripheral flange defined by an annular groove having an inner upstanding wall, a base, and an outer upstanding wall in the upper surface of the closure member, said resiliently deformable flange defining an annular notch which forms an outer sealing lip and an inner venting lip, which venting lip is defined in part by the outer upstanding wall of the groove; said closure member defining at least one aperture that extends through the base of said annular groove, said closure member being compressed in said cylindrical container such that said venting lip is positioned over the inner surface of said groove and against the inner upstanding wall of the groove thereby forming a closed annular groove, and said closure operable such that when the internal pressure in the cell exceeds a predetermined limit the venting lip is momentarily deflected away from the inner upstanding wall of the groover to allow the release of such pressure from within the cell.

In another aspect, this invention relates to a method for the production of galvanic cells having a resealable all-plastic vent path comprising the steps of:

(a) assembling within a cylindrical container an anode, a cathode separated from said anode by a separator and disposing electrolyte therein;

(b) providing a plastic closure member comprised of a resiliently deformable peripheral flange defined by an annular groove having an inner upstanding wall a base, and an outer upstanding wall, in the upper surface of the closure member, said resiliently deformable flange having an outer diameter greater than the inner diameter of said cylindrical container and defining an annular notch which forms an outer sealing lip and an inner venting lip, which venting lip is defined in part by the outer upstanding wall of the groove; said closure member defining at least one aperture that extends through the base of said annular groove; and (c) placing said closure member within the open end of said cylindrical container and compression sealing said container such that the venting lip of said closure member is positioned over the inner surface of said groove and against the inner upstanding wall of said groove thereby forming a closed annular groove and seal for the cell.

As used herein the term annular groove shall refer to a continuous circular recess or at least one arc segment of a circular recess in the closure member which has a substantially flat bottom with upstanding sidewalls or is substantially U-shaped in cross-section. The term annular notch shall refer to a continuous circular recess or at least one arc segment of a circular recess which is substantially V-shaped in cross-section, said V-shape being defined by straight and/or curved walls.

It is to be noted that the closure member employed in the cell of this invention is typically molded such that the annular groove is in an open configuration. Only after assembly and compression within the cell container does the annular groove assume the closed position, i.e. with the venting lip, positioned over the inner surface of the groove and against the inner upstanding wall of the groove.

The closure member of this invention is composed of a resiliently deformable plastic such as nylon, polyethylene or polypropylene. Because pressure is released through a vent path which employs a plastic-to-plastic interface, electrolyte is less likely to creep into said interface due to electrocapillary action, thus resulting in the formation of a "dry" path gas venting seal. In contrast, in prior art venting means which involve a plastic-to-metal interface, electrolyte will tend to creep along the metal surface forming a "wet" path which will interfere with the vent's ability to reseal.

The closure member is typically molded in a one-piece construction utilizing conventional molding techniques well known to those skilled in the art. A conductive terminal cap may be incorporated as an insert when the dry-path gas venting seal of this invention is molded, thus giving a unitary cap-seal assembly.

In the design of a particular dry-path gas venting seal, there are a number of variables which must be taken into account. The pressure required for the venting lip to deflect, thus allowing excess pressure to be released from the cell, is dependent upon the physical properties of the closure member material as well as upon the compressive force applied to seal the cell and the dimensions of the particular closure member involved. For any given material the deflection pressure will increase with increased compression of the closure member. This is because the greater the compressive force applied in sealing the cell, the more tightly the venting lip will be pressed against the inner groove wall. Because of this increased radial pressure, greater internal pressure will be required to deflect the venting lip.

The deflection pressure required to vent the cell will also be dependent on the dimensions of the particular closure member employed, as a thicker venting lip will require a greater deflection pressure. Moreover, the shape of the venting lip will also affect the deflection pressure, as it is not necessary that the walls of the groove or of the notch be vertical so long as the cell may be compression sealed such that a dry path gas venting passage is present.

The preferred dimensions of the seal closure member will vary in accordance with the cell system employed, cell size, the closure member material, and other similar factors. However, for AA size cell of the zinc chloride type employing a polyethylene closure member the following dimensions are typical for the closure member in its molded form. The width of the bottom of the closure member, which is placed in the open end of the cell container is about 0.5 inch (1.27 cm) in diameter. The diameter of the "top" of the closure member (i.e. including the annular flange) is typically about 0.54 inch (1.37 cm), while the diameter of the circle formed by the innermost wall of the annular groove is about 0.44 inch (1.12 cm). The groove is about 0.015–0.02 inch (0.038–0.05 cm) across and about 0.04 inch (0.1 cm) deep, the closure member having a thickness of about 0.08 inch (0.2 cm) in the area adjacent to the annular groove.

The closure member defines at least one aperture which communicates with the annular groove. The at least one aperture should be of sufficient size such that said aperture will not become plugged with electrolyte or other material. The preferred dimensions and number of apertures will vary according to the particular cell size, cell components, and the like. In AA size cells of the zinc chloride type, typically three apertures each about 0.002 square inches (0.01 square cm) are present. The shape of the at least one aperture is not critical.

The closure member may be molded defining a central hole such that an electrode such as a carbon rod or cathode collector can be force-fitted through such closure member. The seal around the electrode may be assisted by silicone grease or other sealant or adhesive type material. In some embodiments of this invention the closure member will comprise a flange about such central hole.

Preferably, a soft sealant material such as silicone grease is used as a sealing aid in this invention. The sealant may be placed at the cell container/closure member interface and/or at the closure member/central electrode interface, but is not required at the plastic-to-plastic dry path gas venting seal interface.

The cells of this invention are typically produced as follows. The cell components are first assembled into a cylindrical cell container. The closure member is placed within the open end of the cell container and force-fitted over the central electrode. The peripheral flange, which has a diameter greater than the internal diameter of the cell container is simultaneously forced upward and inward. The cell is then conventionally sealed by beading and curling the top of the cell container. This sealing step closes the groove by forcing the sealing lip against the inner upstanding wall of the groove, thus forming the dry venting path of the cells of this invention. The raw cells produced may be finished by securing an outer jacket along with top and bottom covers by means well known to one skilled in the art.

The cell construction of this invention employing a dry path seal is suitable for many types of battery systems. However, it is most preferably utilized in Leclanche or zinc chloride systems.

The present invention will become more apparent from the following description thereof when considered together with the accompanying drawing which is set forth as being exemplary of the present invention and is not intended to be limitative thereof in any respect.

DETAILED DESCRIPTION OF THE DRAWING

Figure 1:
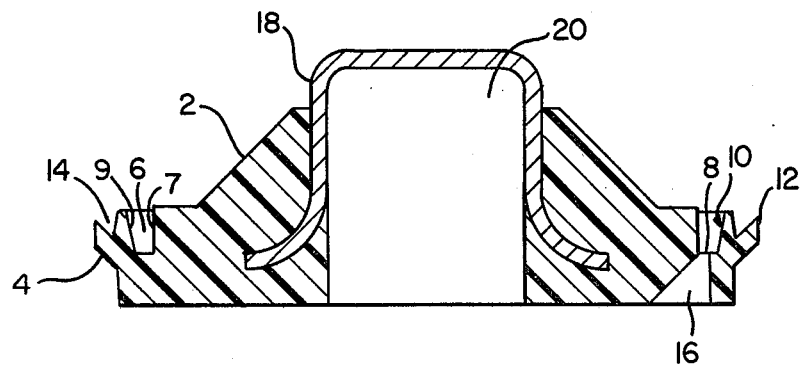
FIG. 1 is a sectional view of a closure member of the cell of the present invention, of a construction particularly useful in cells of the Leclanche or zinc chloride type, in its as-molded form.

Referring in detail to FIG. 1, in its as-molded form closure member 2 has a peripheral flange 4 defined by annular groove 6 located in the periphery of the upper surface of the closure member. This groove has a substantially flat base 8 along with inner upstanding wall 7 and outer upstanding wall 9 or, in some embodiments may be substantially U-shaped in cross-section, and is positioned such that when the cell is crimped and compression sealed peripheral flange 4 will be positioned over the inner surface of groove 6 resulting in said groove assuming its closed configuration. It is not essential that the side walls of the groove be vertical.

Peripheral flange 4 is divided into inner venting lip 10 and outer sealing lip 12 by annular notch 14. At least one aperture 16 is defined by closure member 2 and extends through the base of groove 8 to form a venting path.

Closure member 2 will typically define a central hole 20 of a diameter such that an electrode such as a carbon rod or cathode collector, may be force-fitted therethrough. Closure member 4 may comprise an interior annular flange (not shown) about central hole 20 in order to aid in the force fit of an electrode into said hole. A metal terminal cap 18 may be insert molded into closure member 2 axially aligned over said central hole.

Figure 2:
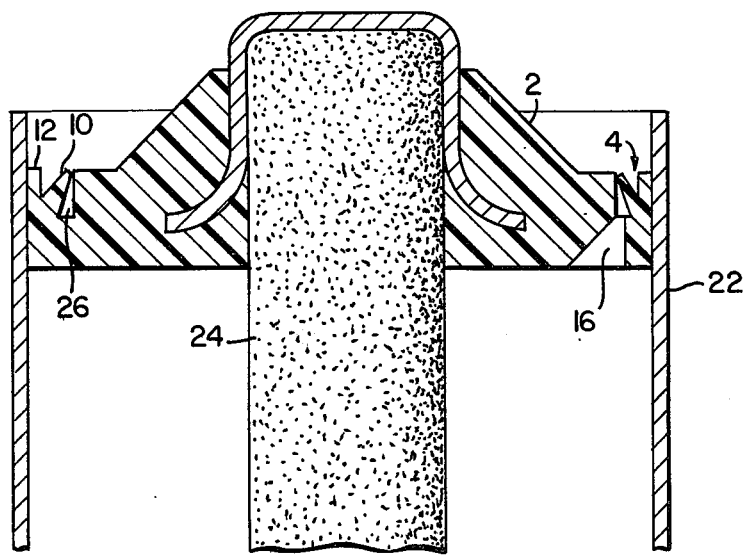
FIG. 2 is a partial sectional view of a partially assembled AA-size carbon-zinc cell of this invention, employing the closure member of FIG. 1.

Turning to FIG. 2, there is shown therein an AA size carbon zinc cell of this invention, said cell being in a partially assembled state. Said cell is comprised of a cylindrical container 22, typically made of a consumable metal such as zinc. Disposed inside said cylindrical container is a depolarizer mix (not shown) containing electrolyte and separated from the container by a separator (not shown).

Closure member 2 is disposed at the open end of container 22 and is force-fitted over carbon electrode 24. If desired, a sealant such as silicone grease may be placed at the junction of carbon electrode 24 and closure member 2.

In its as-molded form peripheral flange 4 has a diameter greater than that of the interior diameter of cell container 22, such that when fitted into the cell container said flange will be forced upward and inward, causing venting lip 10 to be positioned over the inner surface of the annular groove and against the inner upstanding wall of the groove, thereby closing the groove into its sealed position.

Figure 3:
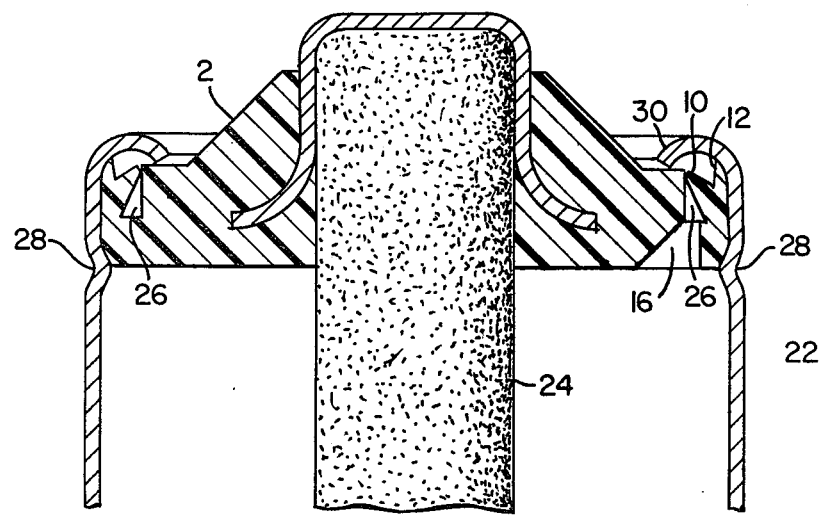
FIG. 3 is a partial sectional view of the view of the cell of FIG. 2 in its sealed form.

In its sealed form, as shown in FIG. 3, closure member 2 is fixed in place by beading cell container 22 at a position 28 just below the closure member 2 and by crimping the top end 30 of cell container 22 by conventional techniques. A sealant, such as silicone grease, may be placed at the cell container/closure member interface. The raw cell produced may be finished by locking an outer jacket along with top and bottom covers by means well known to one skilled in the art.

Having detailed the features of the cells of this invention its manner of operation may now be described. Pressure built up within the cell by gas formation bleeds into closed groove 26 through aperture 16. Notch 14 is provided such that when the pressure in the closed groove exceeds a predetermined limit, venting lip 10 is momentarily deflected into the space of notch 14 away from the inner upstanding well 7 of the groove, allowing such excess pressure to vent from the cell. Because of the radial sealing pressure exerted on closure member 2, once the excess pressure has vented, venting lip 10 returns to its sealed formation, returning the groove to its closed position and resealing the cell.

EXAMPLES

Several AA size paper-lined zinc chloride cells (cell Sample A) were constructed with each containing 8.65 grams of a mix consisting of a solid component comprised of 0.83 grams of acetylene black and 4.57 grams of manganese dioxide, and a liquid component comprised of 0.80 gram of zinc chloride and 2.42 grams of water; a 4.45 gram zinc anode; and a paper separator. A polyethylene closure member having a design similar to that shown in FIG. 1, with three apertures having dimensions of about 0.0125 inch (0.032 cm) by 0.09 inch (0.23 cm), and a metal cap insert molded therein was fitted within the open end of the cell container. The closure member of these cells in its as-molded form comprised a venting lip having a maximum thickness of about 0.0125 inch (0.032 cm). The height of the venting lip was about 0.034 inch (0.087 cm) and the height of the inner wall of the groove was about 0.04 inch (0.1 cm), a ratio of venting lip to inner wall height of approximately 0.85:1. The groove had a width of about 0.0125 inch (0.032 cm). A silicone grease sealant was placed at the junction of the cell container and the sealing lip of the closure member. The cell was then sealed by colleting and crimping by conventional means. The raw cells produced were then finished by securing a jacket to top and bottom cover members.

Several cells having an "extended" dry path seal (Cell Sample B) were constructed employing identical components as described above, except that the venting lip of the closure member had a maximum thickness of about 0.019 inch (0.048 cm) and the ratio of venting lip height to inner groove wall height was approximately 2.11:1, i.e., about 0.036 inch (0.091 cm) to about 0.0125 inch (0.032 cm).

As a comparison, identical cells (Cell Sample C) were constructed, except that the rim vent seal closure of U.S. Pat. No. 3,802,923 was employed, utilizing a silicone grease sealant at the metal-plastic interface.

Fresh cells of each type, and cells of each type which had been stored for 3 months at 45° C., were subjected to a variety of tests as indicated in Table I below. These tests involved discharge across a 4 ohm load for 4 minutes per hour, 8 hourse per day, 7 days per week; and across a 75 ohm resistance for 4 hours continuous per day, 7 days per week; and the times to voltages of 1.1 volts, 0.9 volt and 0.75 volt were recorded. The results of such testing are summarized in Table I.

TABLE I

| Test | Voltage Cutoff | Cell Sample A (Dry Path) | Cell Sample B (Extended Dry Path) | Cell Sample C (Rim Vent) |
|---|---|---|---|---|
| 4 ohm[a] | 1.1 | 70(6)[c] | 65(3) | 72(6) |
|  | 0.9 | 146(6) | 149(3) | 150(6) |
|  | 0.75 | 183(6) | 191(3) | 187(6) |
| 75 ohm 4 hr/day[a] | 1.1 | 55(6)[d] | 55(3) | 55(6) |
|  | 0.9 | 67(6) | 67(3) | 67(6) |
|  | 0.75 | 73(6) | 73(3) | 72(6) |
| 4 ohm[b] | 1.1 | 43(6) | 43(3) | 41(6) |
|  | 0.9 | 107(6) | 100(3) | 106(6) |
|  | 0.75 | 145(6) | 139(3) | 146(6) |
| 75 ohm 4 hr/day[b] | 1.1 | 53(3) | * | 53(3) |
|  | 0.9 | 65(3) | * | 64(3) |
|  | 0.75 | 71(3) | * | 69(3) |

[a] = fresh cells
[b] = cells stored for 3 months at 45° C.
[c] = results for 4-ohm testing are in minutes of actual discharge.
[d] = results for 75-ohm tests are in hours of actual discharge.
* = not tested The above results are average values for the number of cells listed in parentheses. These results indicate that the cells of this invention which employ a dry path gas venting seal will function as effectively as cells employing commercially useful venting seals. Moreover, the cells of this invention may be readily assembled utilizing conventional equipment.

What is claimed is:

1. A galvanic cell comprising a cylindrical container having an anode, a cathode separated from said anode by a separator, and electrolyte disposed therein; and a plastic closure member comprised of a resiliently deformable peripheral flange defined by an annular groove having an inner upstanding wall, a base, and an outer upstanding wall in the upper surface of the closure member, said resiliently deformable flange defining an annular notch which forms an outer sealing lip and an inner venting lip, which venting lip is deformed in part by the outer upstanding wall of the groove; said closure member defining at least one aperture that extends through the base of said annular groove, said closure member being compressed in said cylindrical container such that said venting lip is positioned over the inner surface of said groove and against the inner upstanding wall of the groove thereby forming a closed annular groove, and said closure operable such that when the internal pressure in the cell exceeds a predetermined limit the venting lip is momentarily deflected away from the inner upstanding wall of the groove to allow the release of such pressure from within the cell.

2. The galvanic cell of claim 1 wherein said annular groove is a continuous circular recess and said annular notch is a continuous circular recess.

3. The galvanic cell of claim 1 wherein the plastic closure member defines a central hole such that an electrode may be force-fitted through said hole.

4. The galvanic cell of claim 3 wherein a metal terminal cap is insert molded into the closure member axially aligned over said central hole.

5. The galvanic cell of claim 4 wherein a sealant material is placed at the cell container/closure member interface and at the central electrode/closure member interface.

6. The galvanic cell of claim 1 wherein the closure member is composed of a material selected from the group consisting of nylon, polyethylene and polypropylene.

7. A method for production of galvanic cells having a resealable all-plastic vent path comprising the steps of:
   (a) assembling within a cylindrical container an anode, a cathode separated from said anode by a separator, and disposing electrolyte therein;
   (b) providing a plastic closure member comprised of a resiliently deformable peripheral flange defined by an annular groove having an inner upstanding wall, a base, and an outer upstanding wall in the upper surface of the closure member, said resiliently deformable flange having an outer diameter greater than the inner diameter of said cylindrical container and defining an annular notch which forms an outer sealing lip and an inner venting lip, which venting lip is defined in part by the outer upstanding wall of the groove; said closure member defining at least one aperture that extends through the base of said annular groove; and
   (c) placing said closure member within the open end of said cylindrical container and compression sealing said container such that the venting lip of said closure member is positioned over the inner surface of said groove and against the inner upstanding wall of said groove thereby forming a closed annular groove and seal for the cell.

8. The method of claim 7 wherein said annular groove is a continous circular recess and said annular notch is a continuous circular recess.

9. The method of claim 7 wherein the closure member is provided with a central hole such that an electrode may be force-fitted through said hole.

10. The method of claim 9 wherein a metal terminal cap is insert molded into the closure member axially aligned over said central hole.

11. The method of claim 9 wherein a sealant material is placed at the cell container/closure member interface and at the central electrode/closure member interface.

12. The method of claim 7 wherein the closure member is composed of a material selected from the group consisting of nylon, polyethylene and polypropylene.

* * * * *